United States Patent
Hellinger et al.

(10) Patent No.: US 10,585,170 B2
(45) Date of Patent: Mar. 10, 2020

(54) AUTOMOTIVE RADAR ALIGNMENT

(71) Applicant: Robert Bosch GmbH, Stuttgart (DE)

(72) Inventors: Raphael Hellinger, Novi, MI (US); Oliver F. Schwindt, Palo Alto, CA (US)

(73) Assignee: Robert Bosch GbmH, Stuttgart (DE)

( * ) Notice: Subject to any disclaimer, the term of this patent is extended or adjusted under 35 U.S.C. 154(b) by 463 days.

(21) Appl. No.: 15/328,754

(22) PCT Filed: Aug. 13, 2015

(86) PCT No.: PCT/US2015/045000
§ 371 (c)(1),
(2) Date: Jan. 24, 2017

(87) PCT Pub. No.: WO2016/025683
PCT Pub. Date: Feb. 18, 2016

(65) Prior Publication Data
US 2017/0212215 A1    Jul. 27, 2017

Related U.S. Application Data

(60) Provisional application No. 62/037,871, filed on Aug. 15, 2014.

(51) Int. Cl.
*G01S 7/40* (2006.01)
*G01S 13/93* (2006.01)
*G01S 13/931* (2020.01)

(52) U.S. Cl.
CPC .......... *G01S 7/4026* (2013.01); *G01S 7/4052* (2013.01); *G01S 13/931* (2013.01);
(Continued)

(58) Field of Classification Search
CPC .... G01S 7/4026; G01S 7/4052; G01S 13/931; G01S 2007/403; G01S 2007/4034;
(Continued)

(56) References Cited

U.S. PATENT DOCUMENTS 4,233,605 A * 11/1980 Coleman ................. F41H 11/02
342/14
4,973,964 A    11/1990 Schuster
(Continued)

FOREIGN PATENT DOCUMENTS

DE    102009009046 A1    10/2009
EP            1111714 A2 *   6/2001    ........... G01S 7/4026
(Continued)

OTHER PUBLICATIONS

Letter from foreign associate citing Office Action for Application No. 201580043698.8 dated Sep. 17, 2018 (2 pages).
(Continued)

*Primary Examiner* — Peter M Bythrow
*Assistant Examiner* — Michael W Justice
(74) *Attorney, Agent, or Firm* — Michael Best & Friedrich LLP

(57) ABSTRACT

A method and apparatus for determining misalignment of a radar sensor unit mounted to a vehicle includes providing targets on an alignment apparatus. A vehicle is located at predetermined location on a test station an exact given distance from the alignment apparatus. The actual locations and distances of the targets from each other and from radar sensor unit of the vehicle at the test station are known and pre-stored. At least one target is a greater distance from the vehicle than the other targets. The targets receive and return a radar wave from the radar sensor unit. The radar sensor unit determines locations and distances of the targets and compares with the given or actual locations and distances of the targets to determine misalignment of the radar sensor unit. A calibration program automatically calibrates azimuth and elevation to adjust for misalignment.

16 Claims, 3 Drawing Sheets

(52) U.S. Cl.
CPC . *G01S 2007/403* (2013.01); *G01S 2007/4034* (2013.01); *G01S 2007/4086* (2013.01); *G01S 2007/4095* (2013.01); *G01S 2013/9375* (2013.01); *G01S 2013/9389* (2013.01)

(58) Field of Classification Search
CPC ..... G01S 2007/4086; G01S 2007/4095; G01S 2013/9375; G01S 2013/9389
See application file for complete search history.

(56) References Cited

U.S. PATENT DOCUMENTS

| | | | |
|---|---|---|---|
| 6,087,995 A * | 7/2000 | Grace | G01S 7/4017 340/903 |
| 6,363,619 B1 | 4/2002 | Schirmer et al. | |
| 6,556,166 B1 | 4/2003 | Searcy et al. | |
| 6,778,131 B2 | 8/2004 | Haney et al. | |
| 7,221,310 B2 | 5/2007 | Nakagawa | |
| 8,692,707 B2 | 4/2014 | Lee et al. | |
| 2002/0105456 A1* | 8/2002 | Isaji | G01S 7/4026 342/165 |
| 2003/0090411 A1* | 5/2003 | Haney | G01S 7/4026 342/165 |
| 2013/0088382 A1* | 4/2013 | Lee | G01S 7/4026 342/174 |
| 2014/0347206 A1* | 11/2014 | Steinlechner | G01S 7/4026 342/5 |

FOREIGN PATENT DOCUMENTS

| | | |
|---|---|---|
| EP | 1111714 A2 | 6/2001 |
| EP | 2280288 A1 | 2/2011 |
| WO | 2001057551 A1 | 8/2001 |

OTHER PUBLICATIONS

International Search Report and Written Opinion for Application No. PCT/US2015/045000 dated Aug. 13, 2015 (12 pages).

* cited by examiner

AUTOMOTIVE RADAR ALIGNMENT

RELATED APPLICATIONS

This application claims priority from U.S. provisional application 62/037,871, filed Aug. 15, 2014, the entire content of which is hereby incorporated by reference.

BACKGROUND

This invention relates to an automotive radar alignment method and system.

There are two common methods to align automotive or vehicle radar units in an original equipment manufacturer plant. First is a passive alignment on an optical base. Second is an active alignment method, wherein the radar proves if it is in alignment. For the second method, one target is used, namely a corner reflector. For this approach, mounting tolerances of the radar sensor unit and the mirror directly influence the result of the measurement.

Another method includes a mirror with three tilt angles that are provided in sequence. These three angle positions are used to determine the vertical misalignment angle of the radar. Therefore, three separate measurements are needed. Further, the radar sensing unit mounting position or location on the vehicle needs to be precisely known. Thus, the method is error prone when dealing with variants.

SUMMARY

The invention takes care to combine advantages of mirror and corner reflectors. A better signal to noise ratio results from higher radar cross section independent of a mounting position of the radar sensor unit. By providing the plural reflectors different distances from the vehicle and the radar sensor unit located at a test station, interference between reflected radar waves of the plural reflectors is minimized during calibration. The invention is especially useful for a radar sensor unit that is integrated behind a vehicle bumper and thus disposed out of view. Further, alignment of radar sensor units is performed with at least three corner reflectors, even if the radar sensor units are mounted at different heights or at different lateral positions on a vehicle that are not known. This happens in vehicle production plants often, as there are many different vehicle variants, such as air-suspension vehicles or vehicles having different suspension types that effect the height above ground of the radar sensor units mounted thereon. Lateral positioning of the radar sensor units being out of alignment or not within tolerances occurs less often, but does occur. The longitudinal distance of the corner reflectors from the radar sensor units is known in the method of the invention even if the height of the radar sensor units is not typically known. By utilizing multiple targets as disclosed herein, misalignment and mislocation of the radar sensor unit is accounted for. Therefore, the mounting tolerances for the radar sensing units are greater than for prior art arrangements.

In one embodiment, the invention provides a method for determining misalignment of a radar sensor unit mounted to a vehicle comprising: positioning a vehicle at a test station so that a radar sensor unit mounted thereon is disposed at a given location and a given distance from an alignment apparatus that includes a plurality of targets that form a pattern, the plurality of targets including two targets aligned horizontally and two targets aligned vertically with respect to each other, and wherein at least one of the targets is offset from the other targets a different distance from the radar sensor unit as compared to the other targets; transmitting a radar wave from the radar sensor unit toward the pattern of targets and receiving at the radar sensor unit, radar waves reflected by the pattern of targets. The method includes determining locations and distances of the pattern of targets with the radar sensor unit from the reflected radar waves; comparing the determined locations and distances of the two horizontally spaced targets with given locations and distances for the two horizontally spaced targets stored in a memory and comparing the determined locations and distances of the two vertically spaced targets with given locations and distances for the two vertically spaced targets stored in the memory and determining an alignment for the radar sensor unit from the comparisons of the targets. Finally, the method includes adjusting an alignment of the radar sensor unit based at least on the comparing of the determined locations and distances of the two horizontally spaced targets and the comparing of the determined locations and distances of the two vertically spaced targets.

In another embodiment, adjusting the alignment of the radar sensor unit includes setting an elevation and an azimuth for the radar sensor unit based at least on the two horizontally spaced targets and the two vertically spaced targets, and adjusting the alignment based on the elevation and the azimuth.

In another embodiment, adjusting the alignment of the radar sensor unit is based at least on the two vertically spaced targets that are visually and measurably disposed different distances from the radar sensor unit and the two horizontally spaced targets that are visually and measurably disposed different distances from the radar sensor unit.

Another embodiment includes adjusting the alignment of the radar sensor unit automatically by setting the elevation and the azimuth for the radar sensor unit in view of adjusting calculations based on at least the two horizontally spaced targets and the two vertically spaced targets and the different distances from the targets to the radar sensor unit.

In another embodiment, manually adjusting an orientation of the radar sensor unit is based on the two horizontally spaced targets and the two vertically spaced targets and the different distances from the targets to the radar sensor unit.

In another embodiment, the radar sensor unit is disposed behind a vehicle bumper and out of view.

Another embodiment includes providing a diagnostic device in communication with the radar sensor unit to execute the determining of misalignment of the radar sensor unit.

In another embodiment the invention provides a system for determining misalignment and calibrating a radar sensor unit mounted to a vehicle comprising: an alignment apparatus having a plurality of targets defining a pattern, the pattern of the targets including two of the targets aligned horizontally and two of the targets aligned vertically with respect to each other, and wherein at least one of the targets is offset in depth from the other targets, and the alignment apparatus is configured to be disposed at a predetermined position at a test station; a radar sensor unit mounted to a vehicle for transmitting a radar wave toward the alignment apparatus that includes the pattern of targets and for receiving radar waves reflected from the pattern of targets; and an electronic control unit. The electronic control unit of the radar sensor unit is configured to determine misalignment of the radar sensor unit by: determining location and distance of the two horizontally spaced targets from the reflected radar waves, and determining location and distance of the two vertically spaced targets from the reflected radar waves for a vehicle located at a test station; and comparing the determined locations and distances of the targets from the radar sensor unit with known locations and distances for the targets from the radar sensor unit for a vehicle at a test station to identify misalignment of the radar sensor unit based at least on the two horizontally spaced targets and the two vertically spaced targets.

In another embodiment, the electronic control unit is configured to calibrate the radar sensor unit by automatically setting an elevation and an azimuth for the radar sensor unit based on the comparing of the determined locations and the distances of the targets from the radar sensor unit with the known locations and the known distances of the targets of a vehicle at a test station.

In another embodiment, the electronic control unit sets the elevation and the azimuth for the radar sensor unit in view of a different distance to the radar sensor unit for the at least one of the targets that is offset in depth with respect to the other targets.

In another embodiment, the two targets that are aligned horizontally are spaced from each other along a horizontal x-axis, the two targets that are aligned vertically are spaced from each other along a vertical y-axis, and at least one of the targets that is offset in depth from the other targets is spaced from the other targets along or parallel with a z-axis that is oriented perpendicular to the horizontal x-axis and the vertical y-axis.

One embodiment includes a diagnostic device for connecting to the radar sensor unit to begin operation to identify misalignment and for selectively displaying the identified misalignment of the radar sensor unit to enable a manual calibration of the alignment of the radar sensor unit.

In another embodiment, the electronic control unit is a part of the radar sensor unit.

In one embodiment, one of the targets acts as both one of the two targets aligned horizontally and one of the two targets aligned vertically, and the alignment apparatus includes only three targets. In one embodiment, each of the targets is offset in depth from the other targets to minimize interference among the targets.

In one embodiment, the plurality of targets include target simulators simulating targets with adjustable speed and or distance. In another embodiment, the target simulators are fan blades that rotate to provide unique return radar waves for sensing by the radar sensor unit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
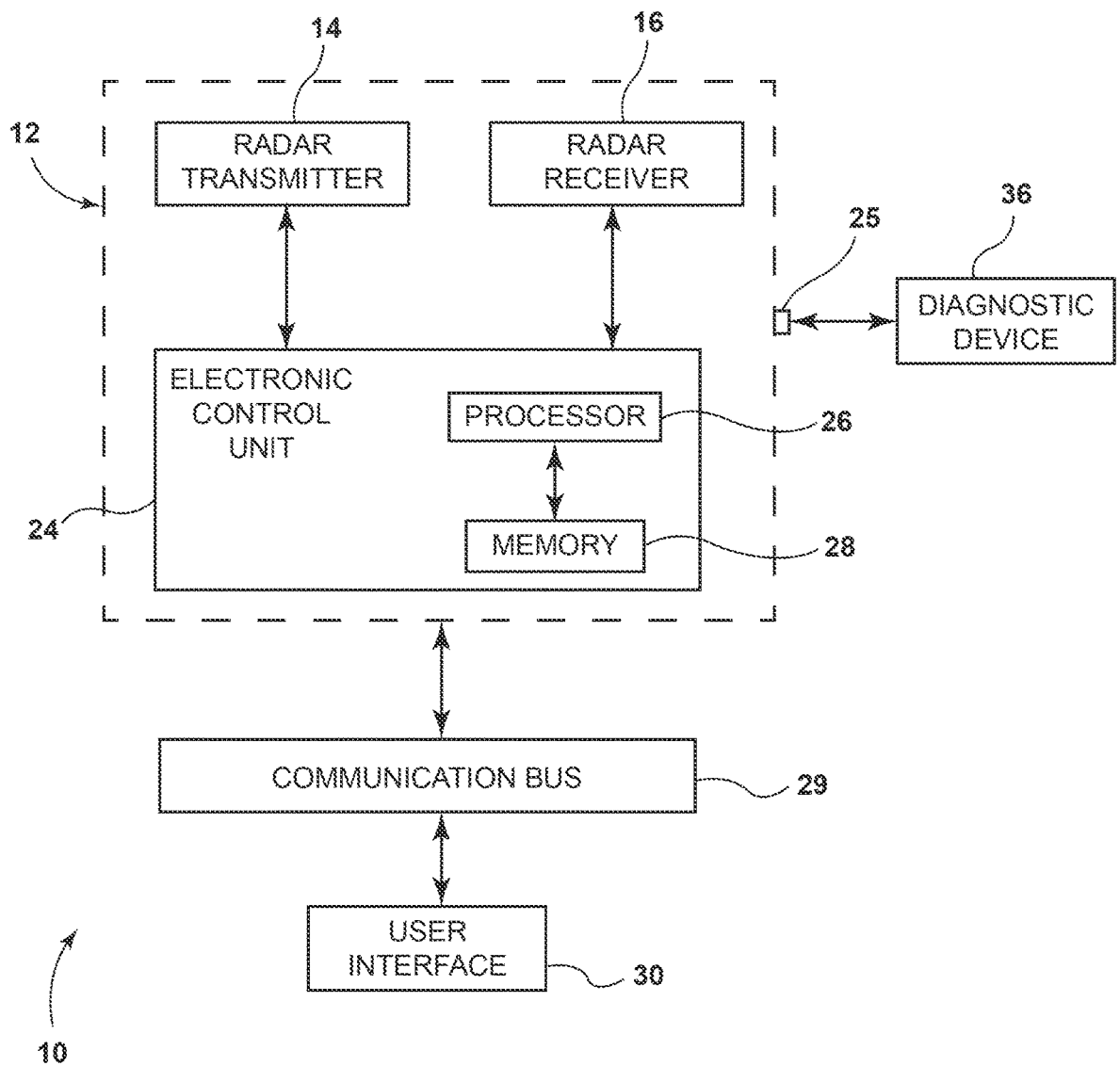
FIG. 1 is a block diagram of a vehicle radar sensor system.

FIG. 1 shows a vehicle radar sensor system 10 that includes a radar sensor unit 12 having a radar transmitter 14 for transmitting a radar wave and a radar receiver 16 for receiving a reflected radar wave. The radar sensor unit 12 includes an electronic control unit (ECU) 24 connected to the radar transmitter 14 and the radar receiver 16. In one embodiment, the ECU 24 of the radar sensor unit 12 includes a diagnostic port 25.

In some constructions, the ECU 24 shown in FIG. 1 includes a processor 26 that has an executable alignment program stored in a non-transitory computer readable memory 28, such as a ROM. In some embodiments, the ECU 24 also includes a RAM for storing information from other vehicle electronic control units that is received through a communication bus 29. Non-transitory computer readable memory 28 of the ECU 24 include volatile memory, non-volatile memory, or a combination thereof and, in various constructions, may also store operating system software, applications/instructions data, and combinations thereof. The ECU 24 is configurable and operable to execute a program or algorithm to determine misalignment for ensuring proper alignment of the radar sensor unit 12.

FIG. 1 shows a user interface 30 that communicates with the ECU 24 via the communication bus 29. The user interface 30 provides inputs to control or operate the ECU 24 and receives outputs from the ECU. In one embodiment, the user interface 30 is a touch screen that displays information related to the radar sensor unit 12 and allows selection of various programs, including a calibration program for calibrating the radar sensor unit 12 of the vehicle.

In another embodiment, a diagnostic device 36 communicates with the ECU 24 of the radar sensor unit 12 via the diagnostic port 25.

Figure 2:
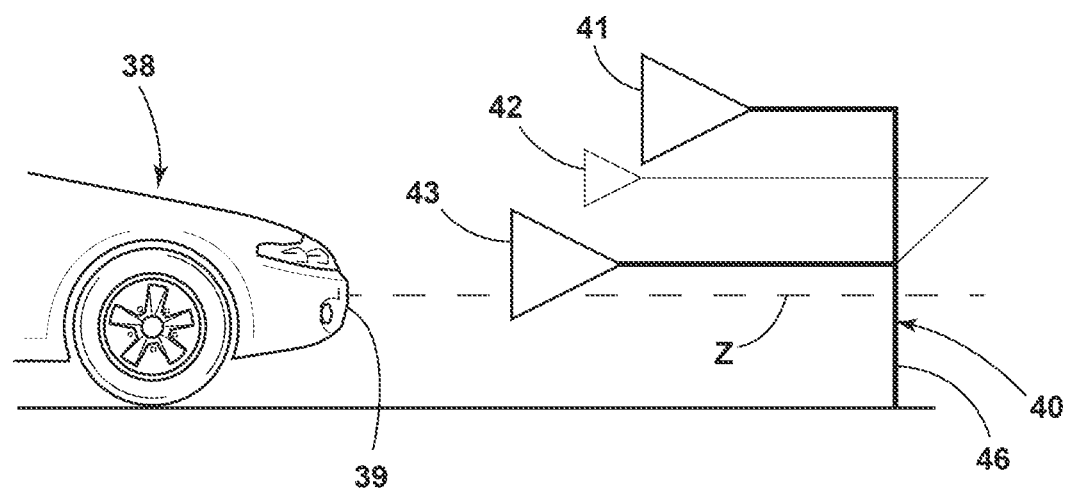
FIG. 2 shows a side view of a vehicle including a radar sensor unit and an alignment apparatus having multiple reflective targets at different distances from the vehicle.

FIG. 2 shows a portion of a front end of a vehicle 38 having a vehicle front bumper 39 that supports the radar sensor unit 12 and other elements shown in FIG. 1. Typically the radar sensor unit 12 is disposed within the vehicle front bumper 39 and the radar waves are emitted through plastic bumper material and reflected radar waves are received through the bumper.

FIG. 2 also shows one embodiment of an alignment apparatus 40 that includes a first target 41, a second target 42 and a third target 43 provided on mounts that are secured or joined to a frame 46. In one embodiment, the alignment apparatus 40 is a movable stand. The location and direction of the individual targets 41-43 are adjustable in some embodiments.

FIG. 2 shows in broken line a z-axis that corresponds to a direction from the radar sensor unit 12 mounted on the vehicle 38 and the alignment apparatus 40. The targets 41-43 are spaced significantly different distances from the vehicle along the z-axis as shown in FIG. 2. In some embodiments, the targets 41-43 shown in FIG. 2 are spaced 25 centimeters to 75 centimeters from each other along the z-axis alone. Thus, the two vertically spaced targets 41, 43 are visually and measurably disposed different distances from the radar sensor unit 12 and the two horizontally spaced targets 42, 43 are visually and measurably disposed different distances from the radar sensor unit 12. Therefore, the depth of the different targets 41-43 is offset from each other along or parallel with the z-axis as shown in FIG. 2. This results in a significantly different distance of at least one target from the radar sensor unit 12 compared to other targets.

Figure 3:
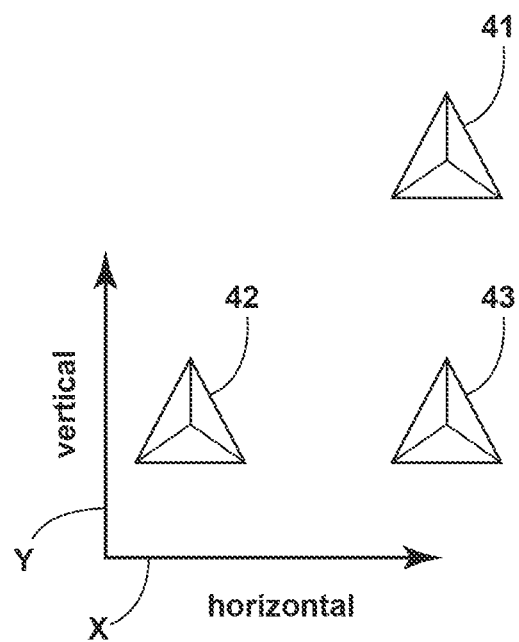
FIG. 3 shows a front view of a sensing pattern of targets of a vehicle alignment apparatus.

FIG. 3 shows a front view for one embodiment of the targets 41-43 of the alignment apparatus 40. In this embodiment, the target 43 is in alignment with the target 42 with respect to the horizontal x-axis. The target 43 also is in alignment with the target 41 along the vertical y-axis. The z-axis shown in FIG. 2 is, of course, perpendicular to both the x-axis and the y-axis. Thus, FIG. 3 shows a pattern of the targets 41-43 wherein two targets 42, 43 are aligned horizontally and two targets 41, 43 are aligned vertically. Target 43 acts as a cross point and functions with both of the other targets to define both horizontal and vertical axes. The targets 41-43 are disposed known distances apart from each other and known typically different distances along or relative to the z-axis from the vehicle 38 that has been brought into range at a testing station, for example of an original equipment manufacturer. The testing station also performs wheel alignment in some embodiments.

The targets 41-43 take different forms in different embodiments. In one embodiment, the three targets are corner reflectors that are disposed frontward and outward of a front end of the vehicle 38 as shown in FIG. 2. The corner reflectors typically have three reflective surfaces oriented in different directions. When multiple corner reflectors are utilized, typically one or more are disposed at a different distance from the radar sensor unit 12 as shown relative to the z-axis in FIG. 2.

In another embodiment, the targets 41-43 are target simulators. The target simulators generally are simulating targets with adjustable speed and distance. In one embodiment, the targets are a fan type of arrangement, wherein fan blades rotate to provide unique return radar waves for different return radar waves to the radar sensor unit 12 that are unique by simulating a velocity or a distance to the reflected signal. Thus, the location of the simulators is easily detected by the radar sensor unit 12. In one embodiment, the simulators are all disposed the same distance from the radar sensor unit 12. The simulators operate at different speeds to provide distinct differences for the reflector radar waves.

Before calibrating of the radar sensor unit 12 begins, a technician begins by positioning the vehicle 38 with the radar sensor unit 12 mounted thereon a known, given distance from the targets 41-43 provided on the alignment apparatus 40. The value is pre-stored in the memory 28 of the radar sensor unit 12 and/or in a memory of the diagnostic device 36. An offset to this distance can also be determined by the radar and taken into account. Information as to the distances and orientations of the targets 41-43 from each other, along with the different distances and orientations in the x-y-z axes from the expected location of the radar sensor unit 12 and the vehicle 38 are pre-stored in the memory 28 of radar sensor unit 12 and/or in the memory of the diagnostic device 36.

Operation

After the vehicle 38 is positioned properly at a test station, the diagnostic device 36 is placed in communication with the radar sensor unit 12 via diagnostic port 25. Thereafter, the diagnostic device 36 prompts the ECU 24 of the radar sensor unit 12 to execute a calibration program for determining misalignment of the radar sensor unit. The calibration program begins operation to identify misalignment and to communicate the identified misalignment of the radar sensor unit to enable a manual calibration of the radar sensor unit, if necessary.

Figure 4:
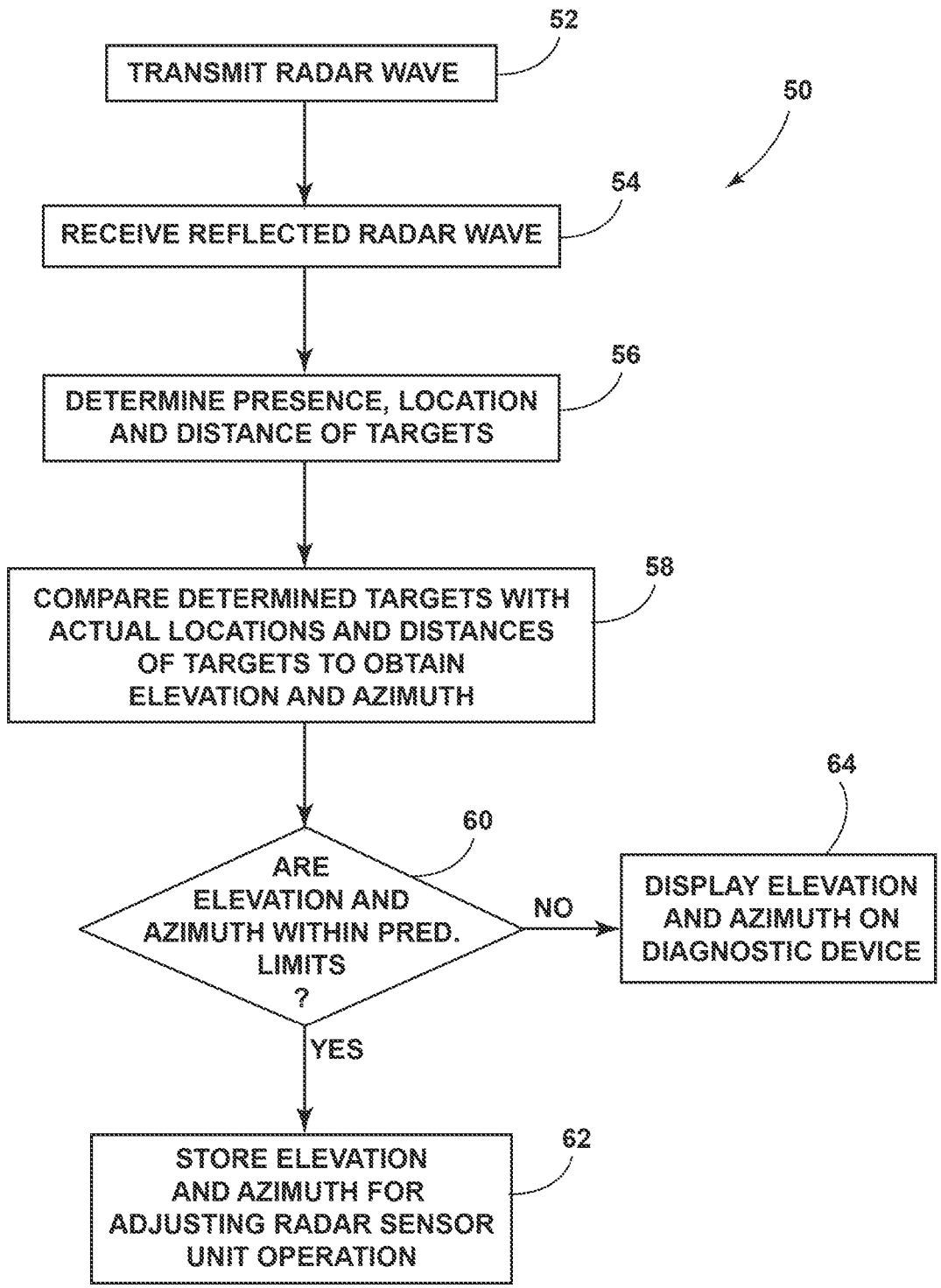
FIG. 4 is a flowchart showing operation of an algorithm to determine misalignment of a radar sensor unit mounted on a vehicle.

The flowchart 50 shown in FIG. 4 represents the calibration program having an algorithm that is executed by the processor 26 to determine misalignment of the radar sensor unit 12 mounted on the vehicle 38.

First, at step 52 the processor 26 of the ECU 24 controls the radar transmitter 14 for transmitting radar waves toward a plurality of targets 41-43 that are arranged to form or define a pattern.

At step 54, the radar receiver 16 receives radar waves reflected by the pattern of targets 41-43 and detects the locations and distances thereof and provides the information or data to the ECU 24. The calibration program advances to step 56.

At step 56, the processor 26 processes the reflected wave data to determine the presence, detect locations (direction) and detect the distances of the multiple targets 41-43 of the alignment apparatus 40 relative to the radar sensor unit 12. The calibration program advances to step 58.

At step 58, the processor 26 compares the locations and distances of the targets 41-43 determined by the processor to the predefined, known locations and distances of the targets that are stored in the memory 28 of the ECU 24 or the memory of the diagnostic device 36 to obtain misalignment values for the radar sensor unit 12. The misalignment values typically correspond to differences in elevation and azimuth of the radar sensor unit 12 due to inaccuracy in the mounting of the radar sensor unit to the vehicle 38. The calibration program advances to step 60.

In one embodiment, step 58 includes comparing the determined locations and determined distances of the two horizontally spaced targets 42, 43 with known locations or given locations, along with distances for the two horizontally spaced targets stored in the memory 28 and comparing the determined locations and distances of the two vertically spaced targets 41, 43 with given, known locations and given distances for the two vertically spaced targets stored in the memory. From the comparisons of the targets, the processor 26 is configured for determining an elevation and an azimuth for adjusting an alignment of the radar sensor unit 12. The elevation includes the determined height of the radar sensor unit 12 as mounted on the vehicle 38 and further may include the orientation of the radar sensor unit 12 in the vertical direction, which is also determined. If the radar sensor unit 12 is misaligned by being oriented upwardly, the orientation corresponding to the amount of vertical misalignment is determined. Thus, tolerances for placement and orientation of the radar sensor units are increased as the calibration program determines and accounts for such differences. Thereafter, the calibration program advances to step 60.

At step 60, the processor 26 compares the elevation and azimuth values for alignment adjustment to stored predefined or predetermined ranges of values. If the elevation and azimuth values are both within the respective range, the calibration program advances to step 62.

At step 62, the elevation and azimuth values are stored as adjustment values in the memory 28 of the ECU 24. The adjustment values account for or represent deviations from the expected location and the expected orientation of the radar sensor unit 12. Thus, whenever the radar sensor unit 12 of the vehicle 38 operates in normal use to detect an object, the elevation and azimuth values are applied to the calculations so that the objects are properly located within the field of view of the radar sensor unit and in an instance when indicated on the user interface 30. Thus, setting an elevation and an azimuth for the radar sensor unit is based at least on the two horizontally spaced targets and the two vertically spaced targets. Therefore, the calibration program automatically adjusts for the misalignment of the radar sensor unit 12 without requiring manual adjustment of the position of the radar sensor unit. At this stage, the algorithm is finished and the calibration program ends.

At step 60, in the event the processor compares the elevation and azimuth values with the stored ranges of values and one of the values is out of range, the calibration program advances to step 64.

At step 64, the elevation and azimuth are selectively displayed on the diagnostic device 36 as one of the values is out of range. Thus, a technician can manually adjust the position of the radar sensor unit 12 by turning mounting screws or adjusting other support elements. The adjustments are correlated to the elevation and azimuth values. Thereafter, the technician may recalibrate the radar sensor unit 12 by operating the diagnostic device 36 to signal the ECU 24 to re-execute the calibration program.

While utilizing all of the data for the multiple targets is disclosed for determining an elevation and an azimuth, other arrangements are contemplated. In one embodiment, the processor 26 determines or sets an elevation and an azimuth for the radar sensor unit 12 based on the two horizontally spaced targets 42, 42 and the two vertically spaced targets 41, 43.

After calibration, the radar sensor unit 12 is capable of sensing a direction, distance and measure a speed of a closing object to determine that the object is closing in distance to a vehicle 38 that the radar sensor unit 12 is mounted on.

While the diagnostic device 36 is provided for a technician to calibrate the radar sensor unit 12, the user interface 30, such as a touchscreen mounted in the vehicle 38, is also capable of performing such an operation in another embodiment.

While three targets 41-43 are shown and generally provide superior results, in some instances more are contemplated to obtain a more certain and accurate result. No more than five targets are typically contemplated due to reflection issues as the number of targets is increased. The radar sensor unit 12 operates in a fixed direction, and thus is free from having to perform scanning.

While a single radar sensor unit 12 is discussed herein. A plurality of radar sensor units 12 are contemplated, including radar sensor units mounted to the vehicle rear bumper and/or at corners of the vehicle 38.

While the embodiment illustrated shows the ECU 24 as a part of the radar sensor unit 12, in some embodiments, the ECU 24 is a separate unit. In this embodiment, the ECU 24 communicates with the radar sensor unit 12 via the communication bus 29.

Finally, the embodiments enable a greater margin for error or tolerances for the mounting and positioning of the radar sensor units 12 on the vehicle 38.

Thus, the invention provides, among other things, a method and system for obtaining a desired position and orientation for a radar sensor unit 12 mounted to a vehicle 38. Various features and advantages of the invention are set forth in the following claims.

What is claimed is:

1. A method for determining misalignment of a radar sensor unit mounted to a vehicle comprising:
    positioning a vehicle at a test station so that a radar sensor unit mounted thereon is disposed at a given location and a given distance from an alignment apparatus that includes a plurality of targets that form a pattern, the plurality of targets including two targets aligned horizontally and two targets aligned vertically with respect to each other, and wherein at least one of the targets is offset from the other targets a different distance along z-axis from the radar sensor unit as compared to the other targets;
    transmitting a radar wave from the radar sensor unit toward the pattern of targets;
    receiving at the radar sensor unit, radar waves reflected by the pattern of targets;
    determining locations and distances of the pattern of targets with the radar sensor unit from the reflected radar waves;
    comparing the determined locations and distances of the two horizontally spaced targets with given locations and distances for the two horizontally spaced targets stored in a memory and comparing the determined locations and distances of the two vertically spaced targets with given locations and distances for the two vertically spaced targets stored in the memory;
    determining an elevation value and an azimuth value for adjusting an alignment for the radar sensor unit from the comparisons of the targets; and
    storing the elevation value and the azimuth value as adjustment values,
    wherein, in operation, the radar sensor unit automatically adjusts for misalignment of the radar sensor unit by applying the elevation value and the azimuth value to calculations.

2. The method of claim 1, wherein the method automatically adjusts for the misalignment of the radar sensor unit without manual adjustment of a position of the radar sensor unit.

3. The method of claim 1, wherein the plurality of targets include corner reflectors having three reflective surfaces oriented in different directions.

4. The method of claim 1, wherein the plurality of targets include target simulators simulating targets with adjustable speed and or distance.

5. The method of claim 4, wherein the target simulators have fan blades that rotate to provide unique return radar waves for sensing by the radar sensor unit.

6. The method of claim 1, wherein the radar sensor unit is disposed behind a vehicle bumper and out of view.

7. The method of claim 1, including providing a diagnostic device in communication with the radar sensor unit to execute the determining of misalignment of the radar sensor unit.

8. A system for determining misalignment and calibrating a radar sensor unit mounted to a vehicle comprising:
    an alignment apparatus having a plurality of targets defining a pattern, the pattern of the targets including two of the targets aligned horizontally and two of the targets aligned vertically with respect to each other, and wherein at least one of the targets is offset in depth along z-axis from the other targets, and the alignment apparatus is configured to be disposed at a predetermined position at a test station;
    a radar sensor unit mounted to a vehicle for transmitting a radar wave toward the alignment apparatus that includes the pattern of targets and for receiving radar waves reflected from the pattern of targets; and
    an electronic control unit of the radar sensor unit configured to determine misalignment of the radar sensor unit by:
        determining location and distance of the two horizontally spaced targets from the reflected radar waves, and determining location and distance of the two vertically spaced targets from the reflected radar waves for a vehicle located at a test station;

comparing the determined locations and distances of the targets from the radar sensor unit with known locations and distances for the targets from the radar sensor unit for a vehicle at a test station to identify misalignment of the radar sensor unit based at least on the two horizontally spaced targets and the two vertically spaced targets;

determining an elevation value and an azimuth value for adjusting an alignment of the radar sensor unit from the comparisons of the targets; and storing the elevation value and the azimuth value as adjustment values, wherein, in operation, the radar sensor unit automatically adjusts for misalignment for the radar sensor unit by applying the elevation value to calculations.

9. The system of claim 8, the electronic control unit is configured to determine the elevation and the azimuth for the radar sensor unit in view of a different distance to the radar sensor unit for the at least one of the targets that is offset in depth with respect to the other targets.

10. The system of claim 8, wherein the two targets that are aligned horizontally are spaced from each other along a horizontal x-axis, the two targets that are aligned vertically are spaced from each other along a vertical y-axis, and the at least one of the targets that is offset in depth from the other targets is spaced from the other targets along or parallel with a z-axis that is oriented perpendicular to the horizontal x-axis and the vertical y-axis.

11. The system of claim 8, wherein the electronic control unit is a part of the radar sensor unit.

12. The system of claim 8, wherein one of the targets acts as both one of the two targets aligned horizontally and one of the two targets aligned vertically.

13. The system of claim 12, wherein the plurality of targets equals only three targets.

14. The system of claim 8, wherein each of the targets is offset in depth from the other targets to minimize interference among the targets.

15. The system of claim 8, wherein the plurality of targets include target simulators simulating targets with adjustable speed and or distance, the target simulators having fan blades.

16. The system of claim 8, wherein the radar sensor unit is configured to automatically adjust for the misalignment of the radar sensor unit without manual adjustment of a position of the radar sensor unit.

* * * * *